US007686521B2

(12) United States Patent
Shi et al.

(10) Patent No.: US 7,686,521 B2
(45) Date of Patent: Mar. 30, 2010

(54) ZERO FORCE SOCKET FOR LASER / PHOTODIODE ALIGNMENT

(75) Inventors: Ting Shi, San Jose, CA (US); Nathan Jones, Los Gatos, CA (US)

(73) Assignee: Finisar Corporation, Sunnyvale, CA (US)

( * ) Notice: Subject to any disclaimer, the term of this patent is extended or adjusted under 35 U.S.C. 154(b) by 1423 days.

(21) Appl. No.: 10/983,416

(22) Filed: Nov. 8, 2004

(65) Prior Publication Data

US 2005/0101172 A1 May 12, 2005

Related U.S. Application Data

(60) Provisional application No. 60/518,982, filed on Nov. 10, 2003.

(51) Int. Cl.
*G02B 6/36* (2006.01)

(52) U.S. Cl. ........................................ 385/89; 439/260

(58) Field of Classification Search .................. 385/15, 385/49, 52, 75, 88–90
See application file for complete search history.

(56) References Cited

U.S. PATENT DOCUMENTS

| | | | | | |
|---|---|---|---|---|---|
| 2,579,135 | A | * | 12/1951 | Alexander | 200/523 |
| 3,317,687 | A | * | 5/1967 | Dehn | 200/47 |
| 3,359,033 | A | * | 12/1967 | Curtis | 294/88 |
| 3,499,203 | A | * | 3/1970 | Schuelke et al. | 29/710 |
| 3,772,636 | A | * | 11/1973 | Webb | 439/201 |
| 3,945,676 | A | * | 3/1976 | Asamoto | 294/88 |
| 3,949,517 | A | * | 4/1976 | Reiner et al. | 446/26 |
| 4,242,037 | A | * | 12/1980 | Baumgarten | 414/739 |
| 4,258,971 | A | * | 3/1981 | Speaker | 439/232 |
| 4,404,669 | A | * | 9/1983 | Miller | 369/170 |
| 4,589,817 | A | * | 5/1986 | Adinolfi et al. | 414/729 |
| 4,629,270 | A | * | 12/1986 | Andrews et al. | 439/260 |
| 4,761,986 | A | * | 8/1988 | Maunz et al. | 72/405.09 |
| 4,869,136 | A | * | 9/1989 | Easter et al. | 81/55 |
| 4,904,197 | A | * | 2/1990 | Cabourne | 439/260 |
| 4,934,778 | A | * | 6/1990 | Gillett | 385/55 |
| 5,108,314 | A | * | 4/1992 | Takano et al. | 439/620.34 |
| 5,449,301 | A | * | 9/1995 | Hanna et al. | 439/510 |
| 5,454,730 | A | * | 10/1995 | Tozuka | 439/438 |
| 5,549,479 | A | * | 8/1996 | Elco et al. | 439/67 |
| 5,596,180 | A | * | 1/1997 | Hofmann et al. | 200/6 B |
| 5,813,876 | A | * | 9/1998 | Rutigliano | 439/260 |
| 6,071,137 | A | * | 6/2000 | Rutigliano | 439/197 |
| 6,116,670 | A | * | 9/2000 | Palone et al. | 294/119.1 |
| 6,206,713 | B1 | * | 3/2001 | Baertsoen et al. | 439/260 |
| 6,325,434 | B1 | * | 12/2001 | Takao et al. | 294/118 |

(Continued)

*Primary Examiner*—Frank G Font
*Assistant Examiner*—Peter Radkowski
(74) *Attorney, Agent, or Firm*—Workman Nydegger

(57) ABSTRACT

The present invention relates to the use of zero force sockets to provide power to an optical device, such as a laser diode or photodiode, during active alignment of the optical device. The zero force sockets can be repeatedly changed between an open position for insertion and removal of optical device leads with minimal drag and a closed position for securing and providing power to the optical device leads. A pneumatically driven air cylinder can be used to open and/or close the zero force sockets. Devices for securing the optical device leads in place include, for example, lead clamps, which close upon conductive sleeves into which the optical device leads have been inserted, and conductive leaf springs, which close (when a pneumatic plunger is withdrawn) upon the laser diode leads, securing them in place and providing a conductive pathway.

22 Claims, 4 Drawing Sheets

U.S. PATENT DOCUMENTS 6,331,025 B1 * 12/2001 Douglas .................. 294/110.1
6,572,396 B1 * 6/2003 Rathburn .................... 439/260
6,796,822 B2 * 9/2004 Sato et al. ................... 439/260
6,824,410 B1 * 11/2004 Co et al. ..................... 439/260
6,979,216 B2 * 12/2005 Maeda et al. ............... 439/260
7,049,822 B2 * 5/2006 Kung ......................... 324/437
7,316,579 B2 * 1/2008 Roath et al. ................. 439/260
2002/0144575 A1 * 10/2002 Niven ........................ 81/57.39
2003/0007774 A1 * 1/2003 Christopher et al. ........ 385/147
2005/0211867 A1 * 9/2005 Margeson ................... 248/550

* cited by examiner

ZERO FORCE SOCKET FOR LASER / PHOTODIODE ALIGNMENT

CROSS-REFERENCE TO RELATED APPLICATIONS

This application claims the benefit of U.S. Provisional Application No. 60/518,982, filed Nov. 10, 2003, which is hereby incorporated herein by reference in its entirety.

BACKGROUND OF THE INVENTION

1. The Field of the Invention

The present application relates to the field of optical communications. More particularly, the present invention relates to methods and devices for actively aligning optical components such as lasers and photodiodes.

2. The Relevant Technology

Computer and data communications networks continue to develop and expand due to declining costs, improved performance of computer and networking equipment, the remarkable growth of the internet, and the resulting increased demand for communication bandwidth. Such increased demand is occurring both within and between metropolitan areas as well as within communications networks. Moreover, as organizations have recognized the economic benefits of using communications is networks, network applications such as electronic mail, voice and data transfer, host access, and shared and distributed databases are increasingly used as a means to increase user productivity. This increased demand, together with the growing number of distributed computing resources, has resulted in a rapid expansion of the number of fiber optic systems required.

Through fiber optics, digital data in the form of light signals is formed by light emitting diodes or lasers and then propagated through a fiber optic cable. Such light signals allow for high data transmission rates and high bandwidth capabilities. Other advantages of using light signals for data transmission include their resistance to electromagnetic radiation that interferes with electrical signals; fiber optic cables' ability to prevent light signals from escaping, as can occur electrical signals in wire-based systems; and light signals' ability to be transmitted over great distances without the signal loss typically associated with electrical signals on copper wire.

Optical devices are commonly packaged as part of an assembly of mechanical, electrical, and optical components designed to couple light into, or receive light from, other optical elements. As one example, an individual optical device may be packaged to couple light into, or receive light from, a single optical fiber. Such optical devices, such as lasers, lenses, and photodiodes that are optically coupled to other devices or waveguides typically need to be suitably aligned so as to effectively pass an optical signal between the various devices.

Particularly, a laser is a light source that produces, through stimulated emission, coherent, near monochromatic light. The emitted laser light can be As HLL modulated to provide optical signals that can be transmitted over great distances. In this manner, an electrical signal is converted to an optical signal for data transmission. The optical signal is, in turn, received and converted back to an electrical signal by a receiver such as a monitor photodiode. A transceiver is an optical device that includes both a laser (as part of a transmitter) and a photodiode (as part of a receiver).

Proper device alignment is important to the operation of both lasers and photodiodes. One conventional method of assembling a laser or photodiode in a larger device involves aligning a laser to a housing/lens assembly with extreme accuracy and then gluing or otherwise securing the parts in place. The alignment must be active, meaning the laser or photodiode is powered up so that the signal is generated or measured. Current methods for holding the laser or photodiode leads to power up the laser produce excessive drag on the laser leads upon extraction of the completed assembly. This drag on the leads causes misalignment of the parts, often because the adhesive is not completely cured. Such problems lead to up to a 5% failure rate in manufacturing.

Accordingly, what is needed are quick, reliable methods of holding laser or photodiode leads for active alignment without damaging the leads.

BRIEF SUMMARY OF THE INVENTION

The present invention relates to the use of zero force sockets to provide power to an optical device, such as a laser diode or photodiode, during active alignment of the optical device. The zero force sockets can be repeatedly changed between an open position for insertion and removal of optical device leads with minimal drag and a closed position for securing and providing power to the optical device leads. In conventional devices, in contrast, the contacts in the sockets drag on the leads which ruin a certain percentage of the optical devices by altering the alignment after the components are permanently secured in place.

The sockets of the present invention include one or more electrical contacts that provide power to the optical device leads when the optical device leads are inserted into the socket and the socket is in a closed position. When the socket is in an open position, however, the electrical contact(s) provide substantially no drag on the optical device leads so that the optical device leads can be removed from or inserted into the socket without damaging the leads or affecting the optical device alignment.

The socket also includes features for placing the socket in a closed position and thereby securing the optical device lead(s) and features for placing the socket in an open position such that the optical device lead(s),can be inserted or removed with substantially no drag.

Accordingly, a first example embodiment of the invention is a zero insertion force socket for use in actively aligning an optical device. The zero insertion force socket can be repeatedly changed between an open position for insertion and removal of optical device leads and a closed position for securing and providing power to the optical device leads. The socket includes one or more electrical contacts, the electrical contact(s) providing power to the optical device leads when the optical device leads are inserted into the socket and the socket is in a closed position, the electrical contact(s) providing substantially no drag on the optical device leads while the socket is in an open position; means for placing the socket in a closed position and thereby securing the optical device lead(s); and means for placing the socket in an open position such that the optical device lead(s) can be inserted or removed with substantially no drag. According to one embodiment of the invention, the means for placing the socket in a closed position and thereby securing the optical device lead(s) and the means for placing the socket in an open position such that the optical device lead(s) can be inserted or removed with substantially no drag both is a pneumatically controlled air cylinder.

According to another example embodiment of the invention, a zero insertion force socket can be repeatedly changed between an open position for insertion and removal of optical device leads and a closed position for securing and providing power to the optical device leads. The socket includes one or more conductive sleeves, the conductive sleeves providing power to the optical device leads when the optical device leads are inserted into the socket and the socket is in a closed position, the conductive sleeves providing substantially no drag on the optical device leads while the socket is in an open position; non-conductive clamp fingers that engage the conductive sleeves to secure the optical device leads when the socket is in a closed position and disengage the conductive sleeves to allow the optical device lead(s) to be inserted or removed with substantially no drag when the socket is in an open position; and a pneumatically controlled air cylinder which changes the socket, and thus the clamp fingers, between the open position and the closed position.

Yet another example embodiment of the invention is another zero force socket for use in actively aligning an optical device that can be repeatedly changed between an open position for insertion and removal of optical device leads and a closed position for securing and providing power to the optical device leads. The socket generally includes: one or more conductive leaf springs; and a pneumatically controlled air cylinder which moves a plunger between a forward position and a retracted position. When the plunger is in the forward position the conductive leaf springs are spread apart, thereby allowing the optical device lead(s) to be inserted or removed with substantially no drag. When the plunger is in the retracted position the conductive leaf springs contact the optical device leads, securing and providing power and/or signals the optical device leads.

These and other features and advantages of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
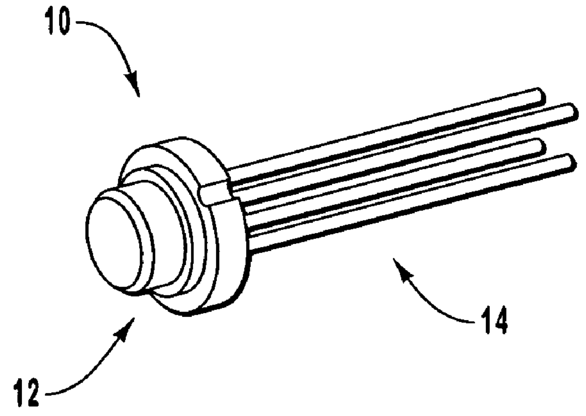
FIG. 1 illustrates an optical device subassembly with conductive leads.
Figure 2:
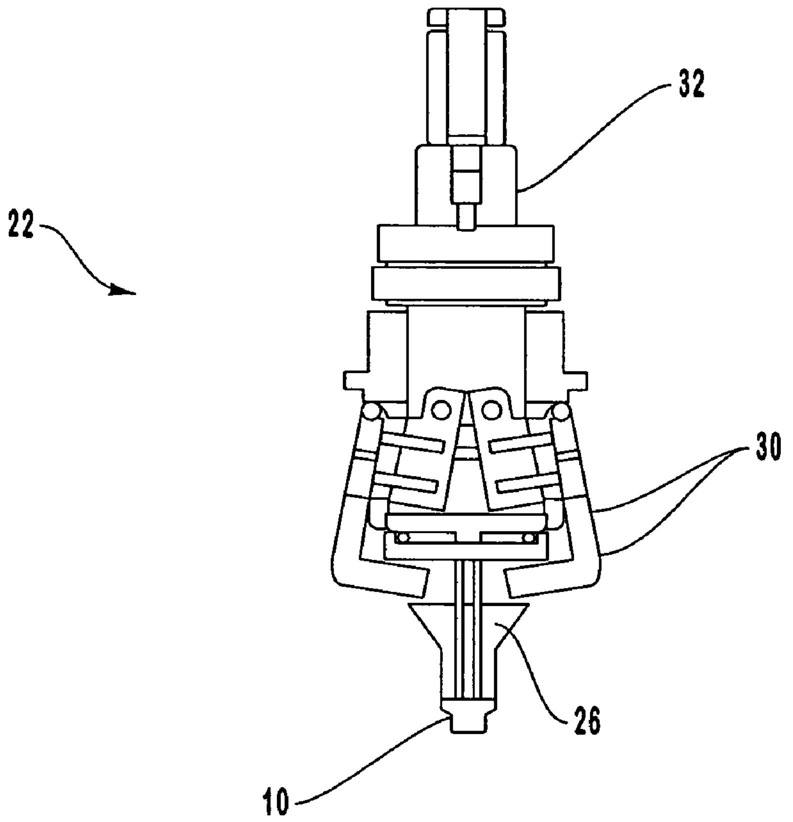
FIG. 2 illustrates a side view of a zero force socket for laser and/or photodiode alignment according to one embodiment of the invention.

The present invention relates to the use of zero force sockets to provide power to an optical device, such as a laser diode or photodiode, during active alignment of the optical device. The zero force sockets can be repeatedly changed between an open position for insertion and removal of optical device leads with minimal drag and a closed position for securing and providing power to the optical device leads. In conventional devices, in contrast, the contacts in the sockets drag on the leads which ruin a certain percentage of the optical devices by altering the alignment after the components are permanently secured in place.

The sockets of the present invention include one or more electrical contacts that provide power to the optical device leads when the optical device leads are inserted into the socket and the socket is in a closed position. When the socket is in an open position, however, the electrical contact(s) provide substantially no drag on the optical device leads so that the optical device leads can be removed from or inserted into the socket without damaging the leads or affecting the optical device alignment.

The socket also includes means for placing the socket in a closed position and thereby securing the optical device lead (s) and means for placing the socket in an open position such that the optical device lead(s) can be inserted or removed with substantially no drag. Such means may be the same or separate structures. The means for placing the socket in open and/or closed positions may include, for example: one or more pneumatically driven air cylinder(s) that activate clamps which secure conductive features to conductive leads on the optical device to be aligned; one ore more pneumatically driven air cylinder(s) that activate a plunger which in turn spreads or releases conductive leaf springs that contact conductive leads on the optical device to be aligned; and other known devices and methods for placing conductive features in contact with each other in a zero-force socket type system; as well as equivalents of each of the foregoing.

In one embodiment, both means are the same pneumatically driven air cylinder. For example, when the air cylinder is activated, non-conductive lead clamps or "clamp fingers" are closed upon conductive sleeves into which the optical device leads have been inserted. Closing the clamp fingers secures the leads against the conductive sleeve walls such that power (or a signal) can be supplied to and/or received from the optical device. When the air cylinder is deactivated the clamp fingers are withdrawn from the conductive sleeves such that the optical device leads can be removed or inserted with minimal drag.

In another embodiment of the invention, activation of the air cylinder pushes a plunger that spreads the leaf springs to an open position such that optical device leads can be inserted or removed with minimal drag. When the air cylinder is deactivated, the plunger is withdrawn and the leaf springs close upon the laser diode leads, securing them in place and providing a conductive pathway to provide power and transmit and/or receive elective signals from the optical device for the active alignment.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of optical systems have not been described in particular detail in order to avoid unnecessarily obscuring the present invention.

Referring to FIG. 1, an example of an optical device 10 that is ready for assembly into a larger device is depicted. The optical device may be, for example, a laser diode or photodiode. The depicted optical device 10 includes a header section 12 and multiple conductive leads 14. Although the construction and shape of the header section 12 is not important to the invention, in one embodiment the header section 12 may include a laser or photodiode and other components necessary for the operation of the laser or photodiode, for example a thermoelectric cooler, an external modulator, and/or a laser driver.

The leads 14 provide electrical communication between the optical device 10 and other electrical devices. For example, the leads 14 can be used to provide communication with an integrated chip in a transceiver. In one embodiment, selected leads are for use in providing power to the package subassembly while others communicate a signal to be transmitted via the laser or received via the photodiode.

Referring now to FIGS. 2-5, side and perspective views of an optical device 10, such as a laser or photodiode, inserted into zero force socket 22 is shown. Leads 14 on the optical device 10 are inserted through plastic non-conductive socket 26 and into openings in electrical contacts 28. In one embodiment the electrical contacts 28 are made of beryllium copper. In addition, the contacts 28 may be configured as sleeves. Because this is a zero insertion force device, no force is required to insert the leads into the contacts 28. The contacts 28 are conductive and are in communication with sources of power for the optical device 10. The contacts 28 may also provide a conduit for communicating an electrical signal to and from optical device 10.

Lead clamps 30 are depicted in an open position such that leads 14 can be easily inserted and removed. Upon activation of clamping air cylinder 32, however, the lead clamps 30 close such that electrical contact between the electrical contacts 28 and the leads 14 is secured. Upon release, or deactivation, of clamping air cylinder 32, the lead clamps 30 open, allowing optical device 10 to be easily removed without drag or resistance between the leads 14 and the contacts 28.

Figure 3:
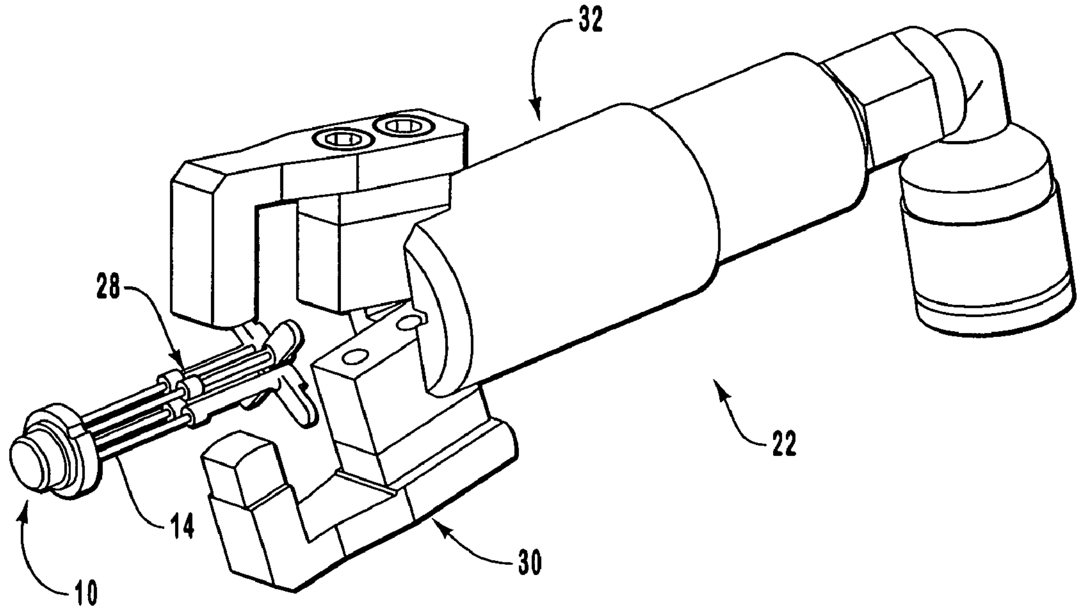
FIG. 3 illustrates a perspective view of a zero force socket for laser and/or photodiode alignment according to one embodiment of the invention.
Figure 4:
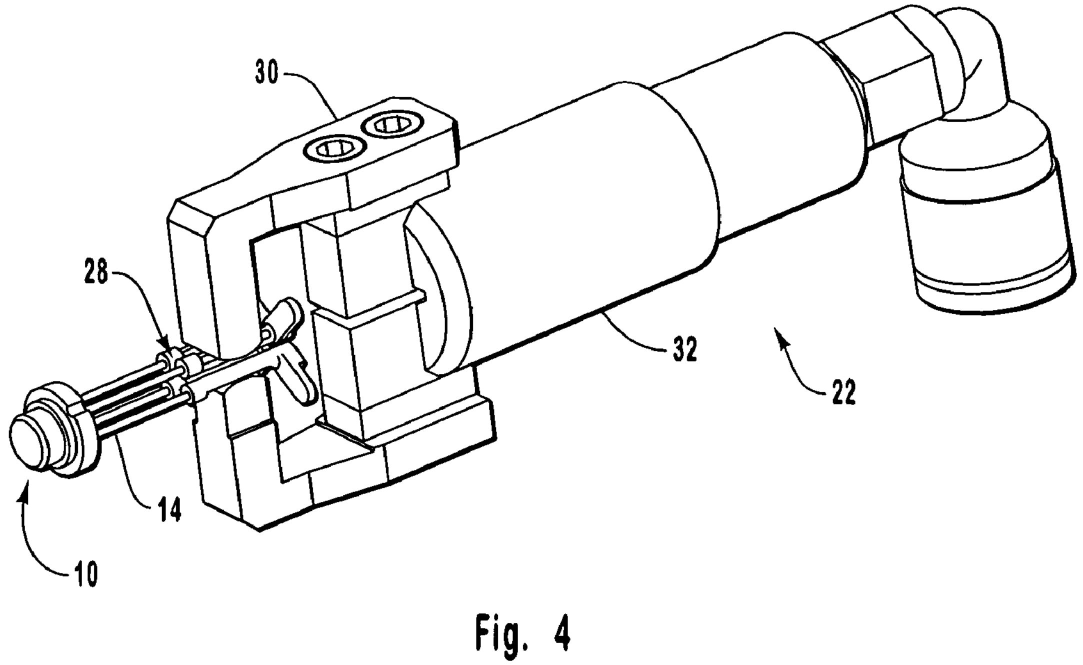
FIG. 4 illustrates another perspective view of a zero force socket for laser and/or photodiode alignment according to one embodiment of the invention.
Figure 5:
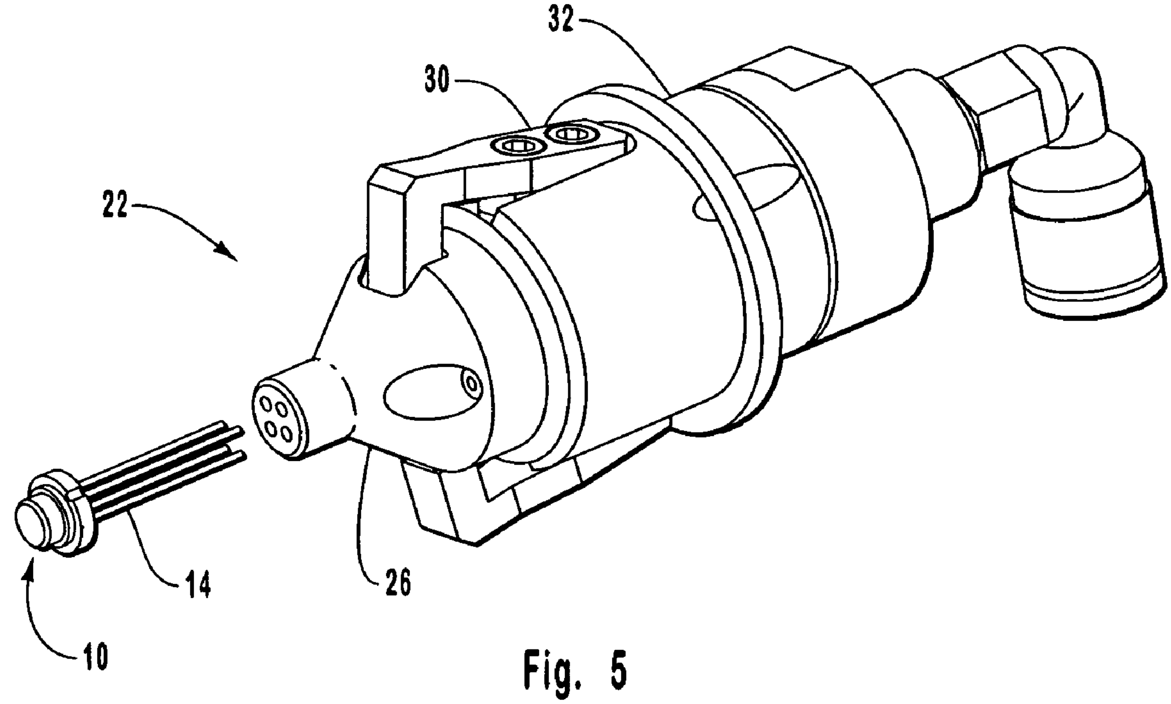
FIG. 5 illustrates yet another perspective view of a zero force socket for laser and/or photodiode alignment according to one embodiment of the invention.

With reference now to FIGS. 3-5, perspective views of the operation of one embodiment of a zero force socket according to the invention are presented. More particularly, FIG. 3 shows a partially cutaway view (compare FIG. 5) in which the socket 22 is in an open position such that the clamp fingers 30 are open. Thus, although the leads 14 are inserted into the contacts 28, the leads can be removed without any significant drag upon them. In FIG. 4, the socket 22 is closed such that the clamp fingers 30 are closed and the leads are secured by and in conductive contact with the contacts 28. Finally, FIG. 5 shows plastic socket 26 when the socket 22 is open and the optical device 10 is removed.

The clamping air cylinder 32 (or gripper/clamp) is powered by compressed air. When the gripper is energized (shown in FIGS. 2 and 4) the clamp fingers 30 clamp the laser leads against the contacts allowing current to flow. When the gripper/clamp is retracted (shown in FIGS. 3 and 5) the clamp fingers 30 release the leads allowing the laser to be removed with little or no friction on the leads.

Figure 6:
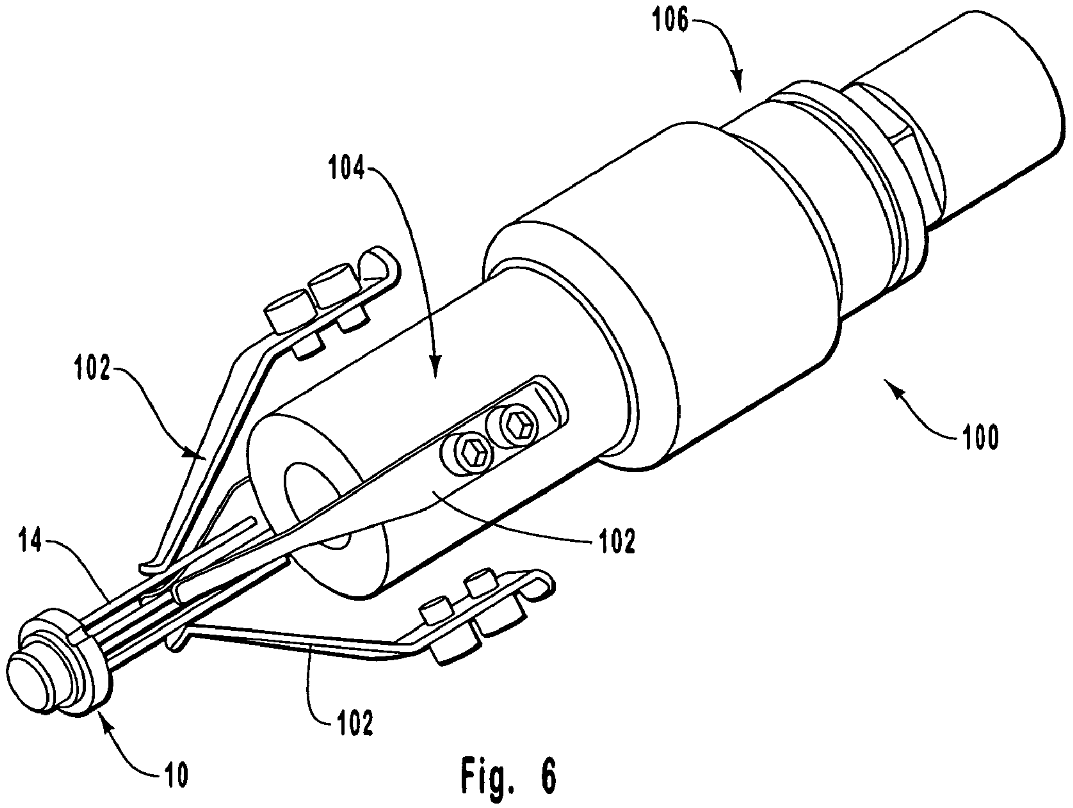
FIG. 6 illustrates a further perspective view of a zero force socket for laser and/or photodiode alignment according to another embodiment of the invention.
Figure 7:
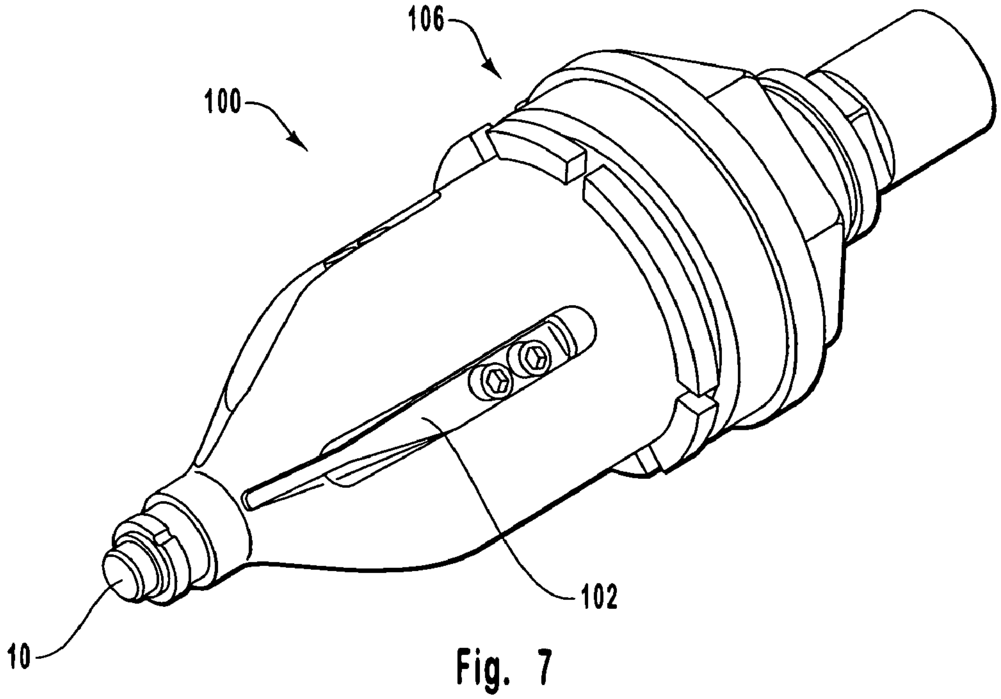
FIG. 7 illustrates yet another perspective view of a zero force socket for laser and/or photodiode alignment according to another embodiment of the invention.

Referring now to FIGS. 6-7, another embodiment of the invention is a leaf spring-based zero force socket 100. It differs from the design of FIGS. 2-5 in that conductive leaf springs 102 make the contact to the leads rather than conductive sleeves. The leaf springs 102 are unclamped from the leads 14 of the optical device 10 by a plunger 104 moved into place by the air cylinder 106. When the plunger 104 is retracted, the clamping force comes from the leaf springs 102, not the air cylinder 106 as before. Generally, FIG. 6 is a cutaway view showing the leaf springs 102 and leads 14 in detail while FIG. 7 shows the fully assembled zero force socket with optical device 10 in place.

Methods of implementing the present invention may be performed by way of various systems and devices, and the scope of the invention should not be construed to be limited to any particular alignment setup, system or device. Generally, the socket us used to position and actively align the optical device 10 with a lens assembly and a housing (each not depicted). Alignment of a lens to the optical device 10 is important because precise alignment results in improved capture of the optical signal generated by the laser or received by the photodiode. During operation or alignment, optical signals generated by a laser diode, for example, in the optical device 10 are aimed at and. transmitted through the lens. The lens may be configured to provide a collimating and focusing effect on the optical signal generated by the laser. The combination of precise alignment and collimating effect of the lens aids the optical signal in being properly introduced into an optical fiber, or other optical device, that is arranged for optical communication with the optical device 10.

In one embodiment, prior to implementation of the alignment method, the header section 12 is securely positioned, such as by a clamp, mount, or other suitable device, in a predetermined position and orientation relative to a lens and/or housing. The zero insertion force socket (in an open position) is then mated with the optical device leads 14. The zero insertion force socket is then closed by activation or deactivation of the air cylinder to provide necessary power and/or optical signals to the optical device 10. The optical device is then aligned by methods known to those skilled in the art or hereinafter developed. For example, various methods of aligning optical devices are disclosed in U.S. patent application Ser. No. 10/832,699, filed Apr. 27, 2004; and U.S. patent application Ser. No. 10/858,292, filed Jun. 1, 2004, each of which is incorporated herein by reference in its entirety.

In general, the position of the header section 12 and, thus, the position of a laser diode or photodiode internal thereto, is then adjusted relative to the lens and/or housing, until the relative alignment of the optical device 10 with respect to the lens and/or housing falls within a desired tolerance range, at which point the header section 12 is secured in place, for example glued in place. In an alternative implementation of the alignment method, the position of the lens and/or header is adjusted relative to the header section 12 so as to cause the relative alignment of the optical device 10 with respect to the lens and/or housing to fall within a desired tolerance range, at which point the header section 12 is secured in place, for example glued in place.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A socket for use in actively aligning an optical device, the socket comprising:

a zero insertion force socket that can be repeatedly changed between an open position for insertion and removal of multiple radially arranged optical device leads and a closed position for securing and providing power to the multiple radially arranged optical device leads, the zero insertion force socket comprising:

one or more radially arranged electrical contacts, the radial arrangement of the electrical contacts corresponding to the radial arrangement of the optical device leads, the electrical contact(s) providing power to the optical device leads when the multiple radially arranged optical device leads are inserted into the zero insertion force socket and the zero insertion force socket is in a closed position, the multiple radially arranged electrical contact(s) providing substantially no drag on the multiple radially arranged optical device leads while the zero insertion force socket is in an open position;

means for placing the socket in a closed position and thereby securing the optical device leads; and means for placing the socket in an open position such that the optical device leads can be inserted or removed with substantially no drag.

2. A socket as in claim 1, wherein the optical device comprises a laser diode.

3. A socket as in claim 1, wherein the optical device comprises a photodiode.

4. A socket as in claim 1, wherein the means for placing the zero insertion force socket in a closed position and thereby securing the optical device leads and the means for placing the zero insertion force socket in an open position such that the optical device leads can be inserted or removed with substantially no drag both comprise a pneumatically controlled air cylinder.

5. A socket as in claim 4, wherein the pneumatically controlled air cylinder closes the zero insertion force socket when it is activated and opens the zero insertion force socket when it is deactivated.

6. A socket as in claim 4, wherein the pneumatically controlled air cylinder opens the zero insertion force socket when it is activated and closes the zero insertion force socket when it is deactivated.

7. A socket as in claim 1, wherein the contacts comprise conductive at least partially hollow and at least partially open sleeves.

8. A socket as in claim 7, further comprising non-conductive clamp fingers that engage the at least partially open portion of the conductive sleeves to secure the optical device leads when the zero insertion force socket is in a closed position.

9. A socket as in claim 6, wherein the contacts comprise conductive leaf springs that flex inward to contact the optical device leads when the zero insertion force socket is in a closed position but are spread apart by a plunger such that the leaf springs do not contact the optical device leads when the zero insertion force socket is in an open position.

10. A socket for use in actively aligning an optical device, the socket comprising:

a zero insertion force socket that can be repeatedly changed between an open position for insertion and removal of multiple radially arranged optical device leads and a closed position for securing and providing power to the multiple radially arranged optical device leads during the active alignment of the optical device, the zero insertion force socket comprising:

multiple radially arranged conductive sleeves, the radial arrangement of the electrical contacts corresponding to the radial arrangement of the optical device leads, the conductive sleeves providing power to the multiple radially arranged optical device leads when the optical device leads are inserted into the zero insertion force socket and the zero insertion force socket is in a closed position, the multiple radially arranged conductive sleeves providing substantially no drag on the optical device leads while the zero insertion force socket is in an open position;

non-conductive clamp fingers that engage the multiple radially arranged conductive sleeves to secure the multiple radially arranged optical device leads when the zero insertion force socket is in a closed position and disengage the multiple radially arranged conductive sleeves to allow the multiple radially arranged optical device leads to be inserted or removed with substantially no drag when the zero insertion force socket is in an open position; and a pneumatically controlled air cylinder which changes the zero insertion force socket, and thus the clamp fingers, between the open position and the closed position.

11. A socket as in claim 10, wherein the optical device comprises a laser diode.

12. A socket as in claim 10, wherein the optical device comprises a photodiode.

13. A socket as in claim 10, wherein the pneumatically controlled air cylinder closes the zero insertion force socket when it is activated and opens the socket when it is deactivated.

14. A socket as in claim 10, wherein the pneumatically controlled air cylinder opens the zero insertion force socket when it is activated and closes the zero insertion force socket when it is deactivated.

15. A socket as in claim 10, wherein the sleeves are encased in a non-conductive material.

16. A socket for use in actively aligning an optical device, the socket comprising:

a zero insertion force socket that can be repeatedly changed between an open position for insertion and removal of multiple radially arranged optical device leads and a closed position for securing and providing power to the multiple radially arranged optical device leads during the active alignment of the optical device, the zero insertion force socket comprising:

multiple conductive radially arranged leaf springs, the radial arrangement of the multiple conductive radially arranged leaf springs corresponding to the radial arrangement of the optical device leads; and a pneumatically controlled air cylinder which moves a plunger between a forward position and a retracted position, wherein:

when the plunger is in the forward position the multiple radially arranged conductive leaf springs are spread apart, thereby allowing the multiple radially arranged optical device leads to be inserted or removed with substantially no drag; and when the plunger is in the retracted position the multiple radially arranged conductive leaf springs contact the multiple radially arranged optical device leads, securing and providing power and/or signals to each of the multiple radially arranged optical device leads.

17. A socket as in claim 16, wherein the optical device comprises a laser diode.

18. A socket as in claim 16, wherein the optical device comprises a photodiode.

19. A socket as in claim 16, wherein the socket comprises a non-conductive material.

20. A method for actively aligning an optical device using the socket of claim 1, comprising:

receiving the optical device leads within the electrical contacts;

placing the socket in the closed position;

actively aligning the optical device with a lens or optical fiber; and placing the socket in the open position.

21. A method for actively aligning an optical device using the socket of claim 10, comprising:

receiving the optical device leads within the conducting sleeves;

placing the socket in the closed position;

actively aligning the optical device with a lens or optical fiber; and placing the socket in the open position.

22. A method for actively aligning an optical device using the socket of claim 16, comprising:

placing the plunger in the forward position;

inserting the optical device leads into the socket;

placing the plunger in the retracted position actively aligning the optical device with a lens or optical fiber;

placing the plunger back in the forward position; and removing the optical device leads from the socket.

* * * * *